United States Patent [19]

Arpino

[11] 4,113,046
[45] Sep. 12, 1978

[54] VEHICLE FUEL ECONOMY INDICATOR

[76] Inventor: Roberto Arpino, 4722 Shire Ridge Rd. W., Columbus, Ohio 43220

[21] Appl. No.: 808,024

[22] Filed: Jun. 20, 1977

[51] Int. Cl.² ............................................. B60K 31/00
[52] U.S. Cl. .................................. 180/105 E; 73/112; 123/102
[58] Field of Search .................... 180/105 E; 123/102; 73/112, 117.2

[56] References Cited

U.S. PATENT DOCUMENTS

| | | | |
|---|---|---|---|
| 1,595,960 | 8/1926 | Brown | 73/112 |
| 3,580,355 | 5/1971 | Kitano | 180/105 E |
| 3,686,935 | 8/1972 | May | 73/112 |
| 3,820,624 | 6/1974 | Sakakibara | 180/105 E |
| 3,878,915 | 4/1975 | Purland | 180/105 E |
| 3,885,644 | 5/1975 | Seidler | 180/105 E |
| 3,946,707 | 3/1976 | Gray | 123/102 |
| 3,983,954 | 10/1976 | Noddings | 180/105 E |

FOREIGN PATENT DOCUMENTS 805,555  12/1958  United Kingdom.

*Primary Examiner*—Joseph F. Peters, Jr.
*Assistant Examiner*—Terrance L. Siemens
*Attorney, Agent, or Firm*—Donald R. Fraser

[57] ABSTRACT

A method and apparatus for indicating the fuel economy of a vehicle during acceleration. A throttle rate signal having a magnitude proportional to the rate of change of the position of the throttle is combined with an acceleration signal having a magnitude proportional to the rate of change of vehicle speed to generate an efficiency signal. The magnitude of the efficiency signal is proportional to the difference of the throttle rate signal and the acceleration signal. The efficiency signal is used to drive an indicator device such as a meter which indicates whether or not the vehicle is accelerating efficiently. The efficiency signal can also be used in a circuit for signaling a vehicle speed control to automatically control the acceleration of a vehicle. In accordance with the present invention, the vehicle speed control is only permitted to advance the vehicle throttle when the efficiency signal indicates that the vehicle is accelerating efficiently.

13 Claims, 1 Drawing Figure

VEHICLE FUEL ECONOMY INDICATOR

BACKGROUND OF THE INVENTION

1. Field Of The Invention

This invention relates in general to an apparatus for controlling the fuel economy of a vehicle and in particular to an apparatus which indicates the efficiency of acceleration of the vehicle and can be adapted to automatically control the vehicle acceleration.

2. Description Of The Prior Art

Early devices for indicating the efficiency of automotive vehicles were mechanical controls having a number of interrelated moving parts. One such device has been disclosed in U.S. Pat. No. 1,595,960, issued Aug. 10, 1926 to James M. Brown and entitled "Efficiency Indicator For Automotive Vehicles". This patent discloses a device which measures both the grade being tranversed by the vehicle and the position of the engine throttle. These two measurements are combined to indicate the speed the vehicle should be traveling under normal conditions. If this speed is different from that indicated by the speedometer, the vehicle is operating below its normal efficiency and should be examined for defects. However, the mechanical linkages associated with this device requires careful adjustments in order to obtain accurate measurements. Furthermore, this device can only indicate the efficiency of a vehicle if the vehicle is traveling at a constant velocity. During periods of vehicle acceleration, the operator would not be aware of the efficiency of the vehicle.

Other devices have been utilized to indicate the efficiency of the vehicle by monitoring the engine's fuel consumption. These devices provide the vehicle operator with a fuel economy measurement such as miles per gallon. Hence, the higher the miles per gallon measurement, the greater the efficiency of the vehicle. However, because the fuel flow in the monitored fuel line does not change instantaneously with the throttle position, these devices cannot effectively measure the efficiency of acceleration of the vehicle. Thus, these devices provide accurate measurements only when the vehicle is operating at a constant velocity.

SUMMARY OF THE INVENTION

The present invention concerns means for indicating the fuel economy of a vehicle during acceleration. A position sensor is connected to the throttle linkage to generate a position signal with a magnitude proportional to the position of the vehicle throttle. A velocity transducer generates a velocity signal which is proportional to the vehicle road speed. The position signal and the velocity signal are conditioned by a pair of conditioning amplifiers and applied to a pair of differentiating circuits to generate a throttle rate signal and an acceleration signal respectively.

The throttle rate signal and the acceleration signal are input signals to a differential amplifier which generates an efficiency signal with a magnitude proportional to the difference between the magnitudes of the input signals. The efficiency signal is used to drive an indicator device such as a meter. The meter indicates the efficiency of acceleration of the vehicle in accordance with the polarity and magnitude of the efficiency signal. If the magnitude of the throttle rate signal is greater than the magnitude of the acceleration signal, the vehicle is not accelerating efficiently. However, if the magnitude of the throttle rate signal is less than or equal to the magnitude of the acceleration signal, the vehicle is accelerating efficiently.

The present invention can also be utilized in conjunction with a vehicle speed control to automatically control the acceleration of the vehicle. If the actual vehicle road speed is less than the desured road speed, the speed control functions to advance the vehicle throttle. In accordance with the present invention, the speed control is only permitted to advance the vehicle throttle when the vehicle is accelerating efficiently.

It is an object of the present invention to enable an operator to efficiently accelerate a vehicle.

It is another object of the present invention to automatically control the acceleration of a vehicle equipped with a speed control system for maximum fuel economy.

DESCRIPTION OF THE PREFERRED EMBODIMENT

Figure 1:
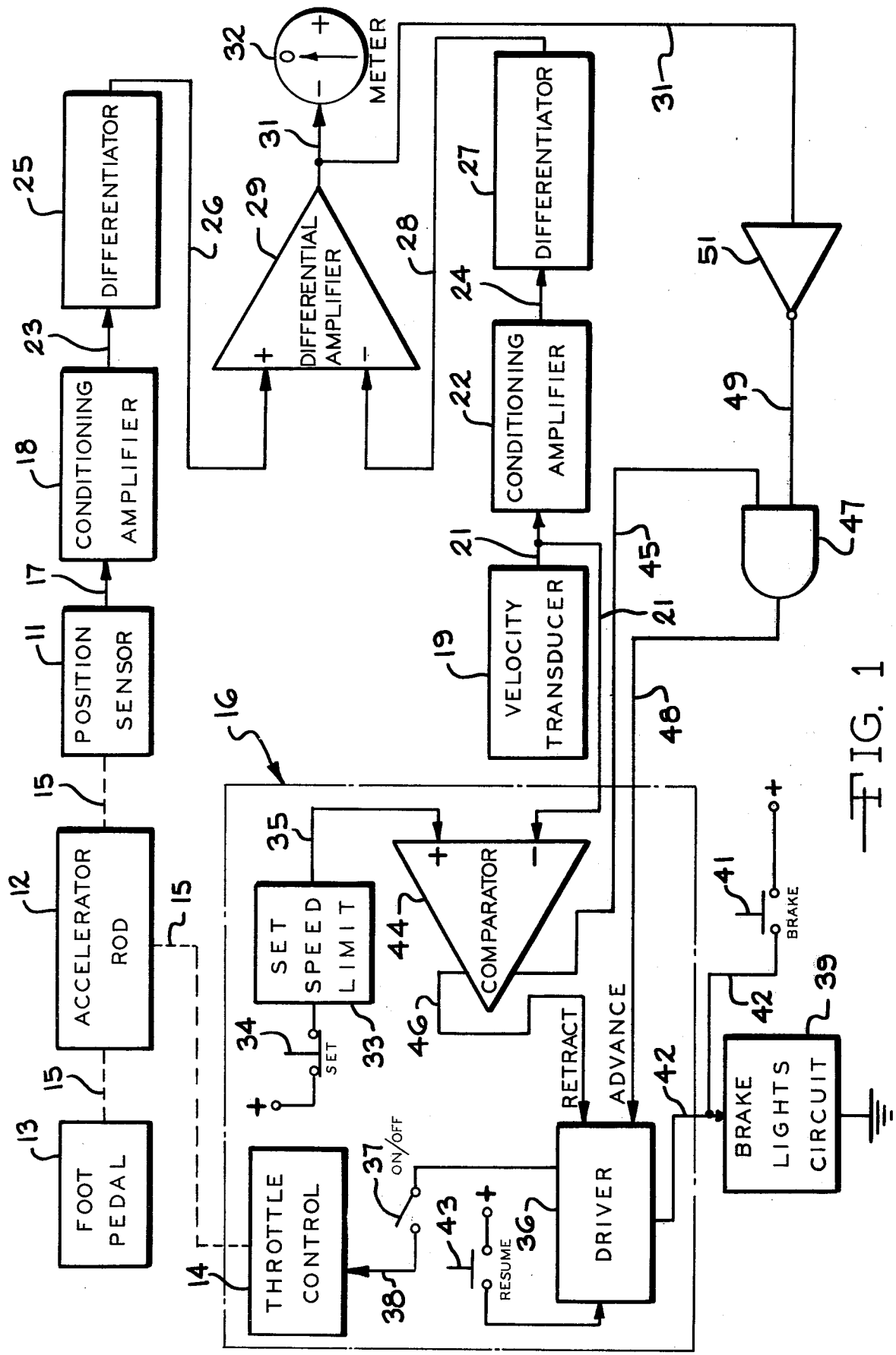
FIG. 1 is a block diagram of an efficiency indicator system and an acceleration control system according to the present invention.

Referring to FIG. 1, there is shown a position sensor 11 which is mechanically connected to an accelerator rod 12. The position of the accelerator rod 12 represents the position of the vehicle throttle linkage which is mechanically connected to a foot pedel 13. The accelerator rod can also be mechanically connected to a throttle control 14 through the accelerator rod 12. A plurality of dashed lines 15 are representative of the mechanical connections to the accelerator rod 12. The position of the foot pedel 13 is controlled by a vehicle operator or the throttle control 14. As will be discussed, the throttle control 14 is included in a speed control 16 to maintain the vehicle at a desired road speed.

The position sensor 11 is typically a transdusser which converts the position of the accelerator rod 12 into an electrical signal which is proportional to the position of the foot pedal 13. This electrical signal, designated as a throttle position signal, is generated by the sensor 11 on a line 17 as an input to a conditioning amplifier 18.

A velocity transducer 19 senses the rotational velocity of an element of the vehicle which is rotating at a speed proportional to the vehicle road speed. The transducer generates a vehicle road speed signal on a line 21 as an input to a second conditioning amplifier 22.

The conditioning amplifiers 18 and 22 are utilized to process the signals on the lines 17 and 21 respectively. The amplifiers 18 and 22 generate a conditioned throttle position signal and a conditioned vehicle road speed signal on lines 23 and 24 respectively. Typically, the amplifiers 18 and 22 are individually adjusted to provide a particular signal gain such that the magnitudes of the position and velocity signals are equal when the foot pedal position corresponds to the sensed velocity.

A differentiating circuit 25 responds to the signal on the line 23 by generating a differentiated signal on a line 26. This differentiated signal, designated as a throttle rate signal, has magnitude proportional to the rate of change of the signal on the line 23. Thus, the throttle rate signal on the line 26 will be proportional to the rate at which the accelerator rod 12 is being moved.

A differentiating circuit 27 responds to the signal on the line 24 by generating a differentiated signal on a line 28. This differentiated signal, designated as a vehicle acceleration signal, has magnitude proportional to the rate of change of the signal on the line 24. Thus, the vehicle acceleration signal on the line 28 will be proportional to the rate at which vehicle is accelerating.

The signals on the lines 26 and 28 are applied to the non-inverting and the inverting inputs respectively of a differential amplifier 29. The amplifier 29 functions to generate an efficiency signal on the line 31 having a magnitude proportional to the difference between the magnitudes of the input signals. Thus, when the magnitude of the signal on the line 26 is greater than the magnitude of the signal on the line 28, the differential amplifier 29 will generate a positive polarity signal on the line 31. However, if the magnitude of the signal on the line 26 is less than the magnitude of the signal on the line 28, the differential amplifier 29 will generate a negative polarity signal on the line 31.

The efficiency signal on the line 31 is applied to an indicator device such as a meter 32. The meter 32 is utilized to indicate fuel economy or efficiency during acceleration of the vehicle. If magnitude of the throttle rate signal on the line 26 is greater than the magnitude of the vehicle acceleration signal on the line 28, the efficiency signal on the line 31 will be at a positive potential and the needle of the meter 32 will be in the positive region between "0" and "+" on the meter face. This indicates that the vehicle is not accelerating efficiently since the rate at which the foot pedal is being depressed is greater than the rate of change of the vehicle road speed signal. Thus, more fuel is being supplied to the vehicle engine than the engine can efficiently utilize and fuel economy suffers.

Efficient acceleration occurs when the rate at which the foot pedal is being depressed is less than or equal to the rate of change of the vehicle road speed signal. Thus, the needle of the meter 32 will be at zero or in the negative region when the vehicle is accelerating efficiently. Efficient acceleration will normally be indicated by a meter reading of zero. The needle of the meter will fall in the negative region only under certain circumstances such as when the vehicle is traveling down a hill and the velocity of the vehicle increases without depressing the foot pedal. Although an analog meter is shown, any suitable indicator device can be utilized.

The present invention can also be utilized in conjunction with the speed control 16 to automatically control the acceleration of the vehicle. As previously mentioned, the speed control 16 functions to automatically maintain the speed of the vehicle at a desired road speed.

The speed control 16 includes a set speed limit circuit 33 which is connected to a positive potential power supply (not shown) through a normally closed set switch 34. When the vehicle has attained the speed desired by the operator, the operator actuates the switch 34 and the set speed limit circuit 33 responds to the opening of the switch 34 by generating a set speed signal on a line 35 having a magnitude proportional to the desired vehicle road speed. The circuit 33 will continue to generate the same signal on the line 35 until the switch 34 is reactuated to obtain a different desired speed. As will be discussed, the set speed signal on the line 35 is compared with the vehicle road speed signal on the line 21 for generating control signals to a driver 36.

A normally open speed control on/off switch 37 is connected between the throttle control 14 and the driver 36. When the switch 37 is closed, the speed control 16 becomes operative and the throttle control 14 receives a throttle control signal through the switch 37 on a line 38 from the driver 36. The driver 36 typically comprises an amplifier which functions to generate the throttle control signal on the line 38. The throttle control signal is utilized by the throttle control 14 to control the position of the accelerator rod 12.

The throttle control 14 functions to either advance or retract the vehicle throttle in accordance with the throttle control signal received from the driver 36. Typically, the throttle control is a servo mechanism which comprises a solenoid coil for controlling a valve between the vehicle engine manifold and a bellows. The bellows is attached to the throttle linkage and may be fully extended by a spring to close the throttle when the interior of the bellows is at atmospheric pressure. When the valve is opened, a vacuum will be created inside the bellows allowing it to partially collapse in a direction to advance the throttle. When the valve is closed the manifold vacuum is blocked and the bellows is connected to atmospheric pressure which allows the spring to extend the bellows and close the throttle.

The driver 36 only generates the throttle control signal on the line 38 when it is connected to the system ground potential through a brake lights circuit 39. A normally open brake switch 41 is connected between the positive polarity power supply (not shown) and a line 42 connected between the driver 36 and the brake lights circuit 39. When the brake switch 41 is actuated by the vehicle operator, the positive polarity voltage will trigger a switch internal to the driver 36 to open. The opening of the internal switch will remove the throttle control signal from the line 37 and return the foot pedal and throttle linkage including the accelerator rod 12 to manual control.

If the speed control has been disabled by the actuation of the brake switch 41, the vehicle can be returned to the previously set desired speed by actuating a resume switch 43. The normally open resume switch 43 is connected between the positive power supply (not shown) and the driver 36. When the resume switch is actuated by the vehicle operator, the driver 36 responds by closing the previously mentioned internal switch and connecting the driver to the system ground. The driver then generates the throttle control signal on the line 37 to the throttle control 14.

The set speed limit signal on the line 35 and the vehicle road speed signal on the line 21 are applied to the non-inverting and inverting input terminals respectively of a comparator 44. The comparator 44 functions such that if the magnitude of the signal at the non-inverting input is greater than the magnitude of the signal at the inverting input, the comparator 44 will generate a positive voltage level signal on a line 45 connected to one output and a ground potential signal on a line 46 connected to another output. However, if the signal at the inverting input is greater than the signal at the non-inverting input the comparator will generate a ground potential signal on the line 45 and a positive potential signal on the line 46. Typically, the comparator 44 functions with a small amount of hysterersis. Thus, the comparator changes output signals only when the magnitudes of the input signals differ by a predetermined amount. The amount of hystereris can be adjusted such that the comparator becomes responsive when the difference in the input signals corresponds, for instance, to a 1 m. p. h. difference between the actual road speed and the desired road speed.

If the magnitude of the vehicle road speed signal on the line 21 is greater than the magnitude of the set speed limit signal on the line 35, the actual vehicle road speed is greater than the desired road speed. Thus, the comparator 44 generates a retract signal at a positive voltage level on the line 46 to the driver 36. The driver responds to the positive retract signal by generating a throttle control signal which causes the throttle control 14 to retract the accelerator rod 12 and the foot pedal 13. When the magnitude of the set speed signal is greater than the magnitude of the vehicle road speed signal, the actual vehicle road speed is less than the desired road speed. The comparator 44 then generates a positive voltage level signal on the line 45 to an input of an AND gate 47. The AND 47 functions to generate an advance signal on a line 48 to the driver 36 if the AND 47 receives a second input signal on a line 49 from the output of an inverter 51. The input of the inverter 51 is connected to the line 31 to receive the efficiency signal from the differential amplifier 29.

As previously mentioned, the vehicle is accelerating efficiently only when the magnitude of the efficiency signal on the line 31 is less than or equal to zero. Thus, when the vehicle is accelerating efficiently, the negative or zero efficiency signal will be changed to a positive polarity by the inverter 51 and will be present on the line 49 as an input to the AND 47. The driver 36 will only generate a throttle control signal which causes the throttle control to advance the accelerator rod 12 when the advance signal on the lin 48 is a positive polarity signal. The advance signal on the line 48 will be at a positive voltage level only when the signals on the AND input lines 45 and 49 are both at a positive voltage level. Hence, the speed control 16 is permitted to advance the vehicle throttle only when the actual vehicle road speed is less than the desired vehicle road speed and the efficiency signal indicates that the vehicle is accelerating efficiently.

In summary, the present invention concerns an apparatus and a method for indicating the fuel economy of a vehicle during acceleration. The apparatus includes a means for generating a vehicle acceleration signal having a magnitude proportional to the rate of change of speed of the vehicle, means for generating a throttle rate signal having a magnitude proportional to the rate of change of the position of the vehicle throttle, means responsive to said vehicle acceleration signal and said throttle rate signal for generating an efficiency signal having a magnitude proportional to the difference between the magnitudes of said vehicle acceleration signal and said throttle rate signal, and indicator means responsive to said efficiency signal for indicating the fuel economy of the vehicle. The present invention can also be utilized to enable a speed control means to automatically accelerate a vehicle at a fuel economical rate. The speed control means includes a source of a signal representing the vehicle speed, a source of a signal representing a desired vehicle speed, means responsive to the vehicle speed signal and the desired speed signal for generating retract and advance signals and means responsive to the retract and advance signals for maintaining the vehicle at the desired road speed. The apparatus then includes means responsive to the efficiency signal and the advance signal for enabling the speed control means to advance the vehicle throttle at a fuel economical rate.

The method according to the present invention comprises the steps of generating a vehicle acceleration signal having a magnitude proportional to the rate of change of speed of the vehicle, generating a throttle rate signal having a magnitude proportional to the rate of change of the position of the vehicle throttle, generating an efficiency signal having a magnitude proportional to the difference between the vehicle acceleration signal and the throttle rate signal and applying the efficiency signal to an indicator means for indicating the fuel economy during the acceleration of the vehicle.

The method also involves enabling a speed control means to accelerate a vehicle at a fuel economical rate wherein the efficiency signal is generated when the vehicle is accelerating at a fuel economical rate. The method then includes a step of generating a signal for enabling the speed control means to advance the vehicle throttle in response to the generation of the efficiency signal whereby the speed control means advances the vehicle throttle when the enable signal is generated and the vehicle speed is below a desired vehicle speed.

In accordance with the provisions of the patent statutes, the principle and mode of operation of the invention have been explained and illustrated in its preferred embodiment. However, it must be understood that the invention may be practiced otherwise than as specifically illustrated and described without departing from its spirit or scope.

What is claimed is:

1. An apparatus for indicating the fuel economy of a vehicle, during acceleration comprising:
   means for generating a vehicle acceleration signal having a magnitude proportional to the rate of change of speed of the vehicle;
   means for generating a throttle rate signal having a magnitude proportional to the rate of change of the position of the vehicle throttle;
   means responsive to said vehicle acceleration signal and said throttle rate signal for generating an efficiency signal having a magnitude proportional to the difference between the magnitudes of said vehicle acceleration signal and said throttle rate signal; and
   indicator means responsive to said efficiency signal for indicating the fuel economy of the vehicle.

2. An apparatus according to claim 1 wherein said means for generating a vehicle acceleration signal includes a source of a signal having a magnitude proportional to the vehicle road speed and a means for differentiating said vehicle road speed signal to generate said vehicle acceleration signal.

3. An apparatus according to claim 1 wherein said means for generating a throttle rate signal includes a source of a signal having a magnitude porportional to the position of the vehicle throttle and a means for differentiating said throttle position signal to generate said throttle rate signal.

4. An apparatus according to claim 1 wherein said efficiency signal generating means is a differential amplifier having said vehicle acceleration signal generating means connected to one input and said throttle rate signal generating means connected to another input.

5. An apparatus according to claim 4 wherein said differential amplifier generates said efficiency signal with one polarity when the magnitude of said throttle rate signal is greater than the magnitude of said vehicle acceleration signal, generates said efficiency signal at a zero magnitude when said signals are equal in magnitude and generates said efficiency signal with the other polarity when the magnitude of said vehicle acceleration signal is greater than the magnitude of said throttle rate signal.

6. An apparatus according to claim 5 wherein said indicator means is an analog meter which indicates fuel economical operation of the vehicle in response to said zero magnitude and said other polarity efficiency signal and indicates noneconomical operation of the vehicle in response to said one polarity efficiency signal.

7. A method of indicating fuel economy during the acceleration of a vehicle, the method comprising the steps of:
generating a vehicle acceleration signal having a magnitude proportional to the rate of change of speed of the vehicle;
generating a throttle rate signal having a magnitude proportional to the rate of change of the position of the vehicle throttle;
generating an efficiency signal having a magnitude proportional to the difference between the magnitude of said vehicle acceleration signal and said throttle rate signal; and
applying said efficiency signal to an indicator means for indicating the fuel economy during the acceleration of the vehicle.

8. An apparatus for enabling a speed control means to automatically accelerate a vehicle at a fuel economical rate, the speed control means including a source of a signal representing the vehicle speed, a source of a signal representing a desired vehicle speed, means responsive to the vehicle speed signal and the desired speed signal for generating retract and advance signals and means responsive to the retract and advance signals for maintaining the vehicle at the desired road speed, the apparatus comprising:
means for generating a vehicle acceleration signal having a magnitude proportional to the rate of change of speed of the vehicle;
means for generating a throttle rate signal having a magnitude proportional to the rate of change of the position of the vehicle throttle;
means responsive to said vehicle acceleration signal and said throttle rate signal for generating an efficiency signal having a magnitude proportional to the difference between the magnitudes of said vehicle acceleration signal and said throttle rate signal; and
means responsive to said efficiency signal and the advance signal for enabling said speed control means to advance the vehicle throttle at a fuel economical rate.

9. An apparatus according to claim 8 wherein said vehicle speed signal has a magnitude proportional to the vehicle road speed; said vehicle acceleration signal generating means includes means for differentiating the vehicle speed signal to generate said vehicle acceleration signal; and said throttle rate signal generating means includes a source of a signal having a magnitude proportional to the position of the vehicle throttle and a means for differentiating said throttle position signal to generate said throttle rate signal.

10. An apparatus according to claim 9 wherein said efficiency signal generating means is a differential amplifier having said vehicle acceleration signal applied to one input and said throttle rate signal applied to another input and said amplifier generates said efficiency signal with one polarity when the magnitude of said throttle rate signal is greater than the magnitude of said vehicle acceleration signal, generates said efficiency signal at a zero magnitude when said signals are equal in magnitude, and generates said efficiency signal with the other polarity when the magnitude of said vehicle acceleration signal is greater than the magnitude of said throttle rate signal.

11. An apparatus according to claim 10 wherein said enabling means is responsive to the presence of the advance signal and said zero magnitude or said other polarity efficiency signal to generate the advance signal to said means for maintaining the vehicle at the desired road speed.

12. An apparatus according to claim 11 wherein said enabling means includes means responsive to said zero magnitude and said other polarity efficiency signal to generate an enable signal and a AND gate having an input connected to receive the advance signal, another input connected to receive said enable signal and an output connected to said means for maintaining the vehicle at the desired road speed whereby said AND gate generates the advance signal at said output when the advance signal and said enable signal are both present at said AND gate inputs.

13. A method of enabling a speed control means to accelerate a vehicle at a fuel economical rate, the method comprising the steps of:
generating a vehicle acceleration signal having a magnitude proportional to the rate of change of speed of the vehicle;
generating a throttle rate signal having a magnitude proportional to the rate of change of the position of the vehicle throttle;
generating an efficiency signal having a magnitude proportional to the difference between the magnitudes of said vehicle acceleration signal and said throttle rate signal; and
genrating a signal for enabling the speed control means to advance the vehicle throttle in response to said generation of said efficiency signal whereby said speed control means advances the vehicle throttle when said enable signal is generated and the vehicle speed is below a desired vehical speed.

* * * * *